Dec. 18, 1962 R. I. WARD 3,069,116
EMERGENCY GENERATOR AND VACUUM PRODUCING MEANS FOR AIRPLANES
Filed June 19, 1961 2 Sheets-Sheet 1
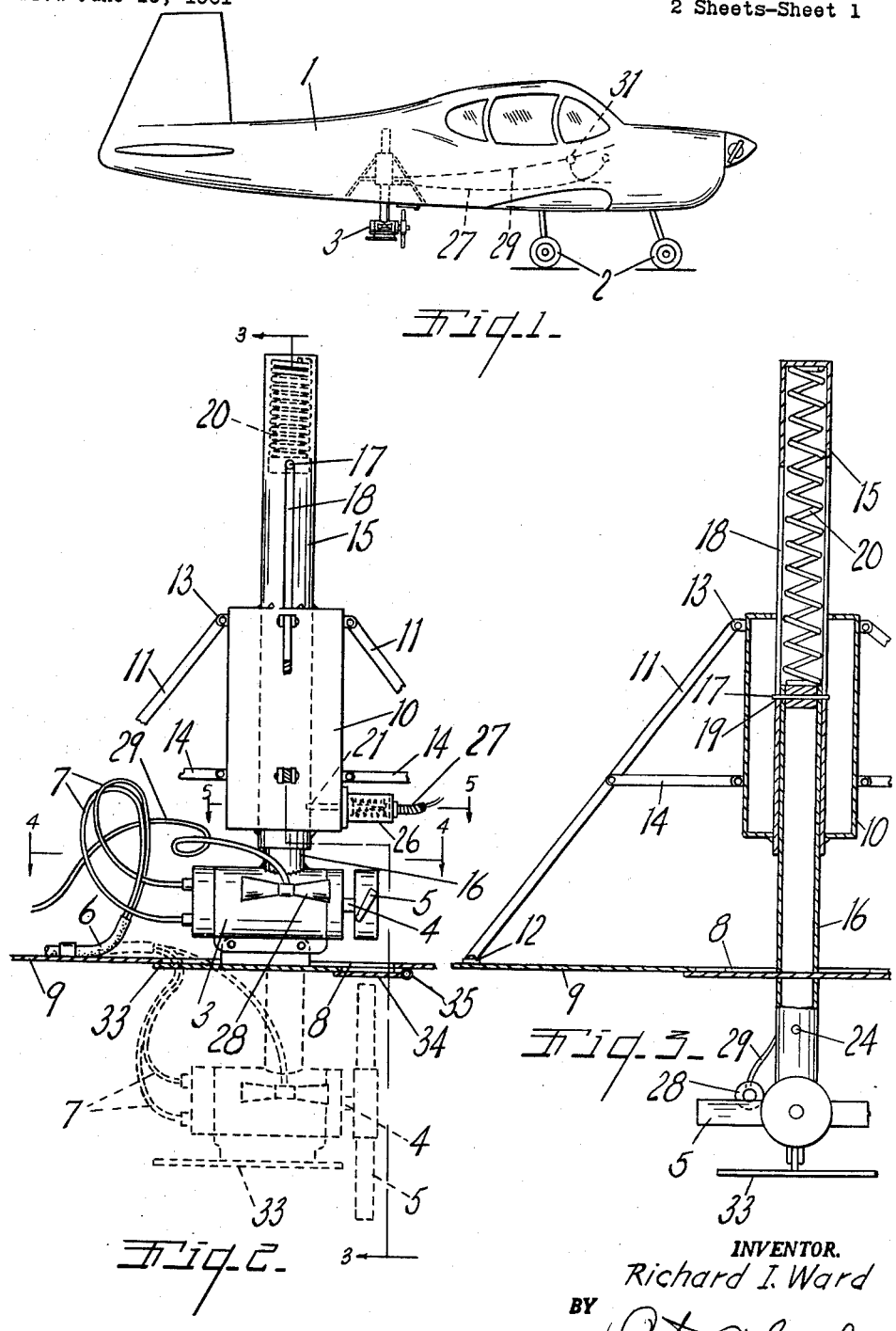
INVENTOR.
Richard I. Ward
BY
ATTORNEY.

Dec. 18, 1962 R. I. WARD 3,069,116
EMERGENCY GENERATOR AND VACUUM PRODUCING MEANS FOR AIRPLANES
Filed June 19, 1961 2 Sheets-Sheet 2

INVENTOR.
Richard I. Ward
BY
*Otto A. Earl*
ATTORNEY.

United States Patent Office 3,069,116
Patented Dec. 18, 1962

3,069,116
EMERGENCY GENERATOR AND VACUUM PRODUCING MEANS FOR AIRPLANES
Richard I. Ward, Municipal Airport,
Three Rivers, Mich.
Filed June 19, 1961, Ser. No. 118,160
11 Claims. (Cl. 244—58)

This invention relates to an electric generator and vacuum producing assembly for airplanes which is well adapted for emergency use.

The principal objects of this invention are:

First, to provide an air driven electric generator for airplanes well adapted for emergency use and which is mounted to be housed within the fuselage in non-use position and to be projected therefrom for use.

Second, to provide an electric generator having these advantages which is readily installed in an airplane fuselage and occupies relatively little space therein.

Third, to provide a combined generator and vacuum producing unit which is projected to use position upon the withdrawal of a manually released detent and one in which the detent may be withdrawn by an operator positioned at a distance from the unit, as for example by the pilot and simply by a pull on a cable.

Fourth, to provide a generating apparatus embodying the above mentioned advantages which is located when projected to use position so that it is not likely to be damaged in the landing of the airplane while the generator is in its projected use position.

Fifth, to provide a combined generator and vacuum assembly which is compact and well adapted for emergency use.

Sixth, to provide a structure having these advantages in which the supporting parts are entirely housed within the airplane and in which there are no projecting parts when the apparatus is in non-use position.

Objects relating to details and economies of the invention will appear from the description to follow. The invention is defined and pointed out in the claims. A desirable embodiment of the invention is illustrated in the accompanying drawing, in which:

FIG. 1 is a side elevational view of an airplane, the body of which is mainly shown conventionally with the generator embodying my invention in projected position, the wiring and other conduits being omitted.

FIG. 2 is a fragmentary side elevational view with the generator shown in retracted position by full lines and in projected position by dotted lines.

FIG. 3 is a fragmentary view in section on a line corresponding to line 3—3 of FIG. 2 with the generator unit shown in projected position by full lines.

It should be understood that in the accompanying drawings certain of the parts are shown conventionally and that no attempt has been made to illustrate the dimensions in relatively proportioned use relation, but that the drawings illustrate a functioning structure.

The airplane body 1 illustrated is shown conventionally and no main impelling or driving means are illustrated, as such means form no part of my present invention, also, the wheels 2 are conventionally illustrated in projected or use position and no retractable supporting means therefor are illustrated.

Figure 4:
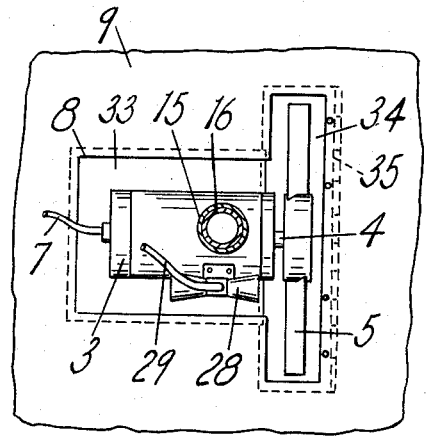
FIG. 4 is a fragmentary view in section on a line corresponding to line 4—4 of FIG. 2, only fragments of the wiring and the vacuum conduit being illustrated.

The generator unit, designated by the numeral 3, is shown conventionally and it comprises a suitable housing desirably of cylindrical cross section, the driving shaft 4 projecting therefrom and a driving impeller or driving blades 5 mounted thereon and projecting forwardly of the body member. The current conductor is designated at 6 and it includes flexible terminals 7 extending from the generator. As stated, the generator is shown in its extended or use position in FIGS. 1 and 3 and in retracted position by full lines in FIG. 1 and in projected or use position by dotted lines. An opening 8 is provided in the bottom 9 of the fuselage, this being desirably of T-shape, as is illustrated in FIG. 4, and it is dimensioned to permit the free passage of the generator therethrough and the impeller blades 5.

The generator supporting standard comprises the vertically disposed body member 10 supported by the downwardly and outwardly diverging legs 11 connected to the floor 9 at 12 and to the body member 10 at 13. Struts or braces 14 connect these legs to the body member 10 to support it in upright position. A tubular slideway 15 is fixedly mounted on the support 10 and in the embodiment illustrated projects above the same.

In the embodiment illustrated the generator hanger 16 is also tubular and is a sliding fit in the slideway 15. The hanger is provided with laterally projecting lugs 17 slidingly engaged in the slots 18 in the slideway to prevent rotative movement of the hanger and also to serve as stops which engage the bottom portion 19 of the slots 18.

Figure 5:
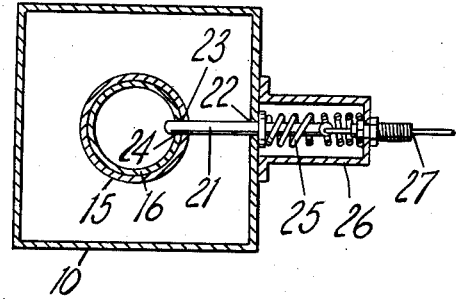
FIG. 5 is an enlarged fragmentary view on a line corresponding to line 5—5 of FIG. 2 illustrating means for holding the generator in its retracted position.

The coiled spring 20 disposed in the slideway above the hanger coacts with the weight of the generator to project it downwardly to use position as shown by full lines in FIG. 1 and by dotted lines in FIG. 2. The generator is held in its retracted position by the spring actuated detent 21 which is reciprocatingly disposed through an opening at 22 provided therefor in the body member 10 of the standard. This reciprocates and is further supported by an opening 23 provided therefor in the slideway 15, see FIG. 5, and the hanger 16 is provided with an opening or hole 24 alignable with the opening 23 to receive the detent, as illustrated in FIG. 5, which is urged to engaging position by the coiled spring 25 disposed in the bracket 26. The detent is disengaged by a pull on the flexible release member 27 which may be extended as indicated by dotted lines in FIG. 1 to a position to be manipulated by the pilot or someone remotely positioned relative to the generator unit. With this arrangement, all that is necessary to do to project the generator to use position is to disengage the detent and the generator is automatically projected by its own weight plus the spring 20.

Figure 6:
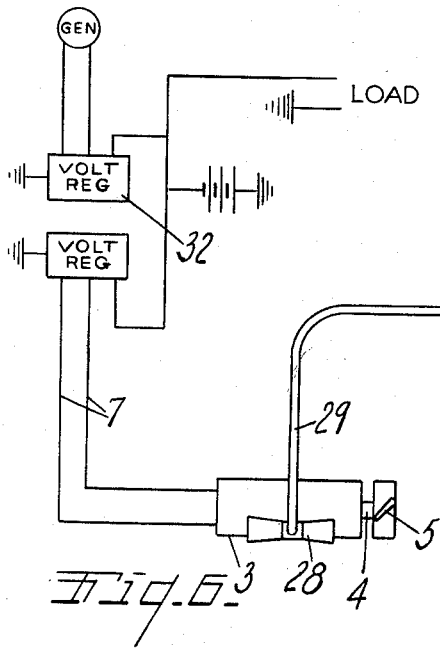
FIG. 6 is a fragmentary view illustrating the opposite relation of the auxiliary generator to the main generator and the circuit of the airplane and the relationship of the vacuum producing means to the generator body member.

In the embodiment of my invention illustrated, a Venturi tube 28 is mounted on the side of the generator and a hose 29 is connected thereto. This is designed to be used in the event of failure of the vacuum pump, the vacuum conduit being indicated at 30, the valve being conventionally shown at 31, see FIG. 6, which also conventionally illustrates the electrical connections for the generator 3 to the electrical system of the airplane, designated generally by the numeral 32.

Figure 7:
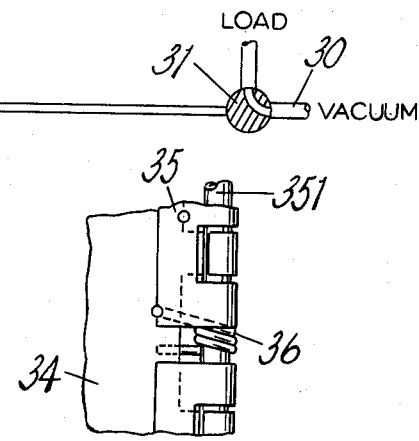
FIG. 7 is an enlarged fragmentary view of the closure member for the opening provided for the projection and retraction of the generator driving blades.

The opening 8 in the bottom of the fuselage is closed when the generator is in retracted position, the closure member 33 being fixedly mounted on the underside of the generator which closes the generally rectangular portion thereof. A supplemental closure member 34 is hingedly mounted at 35 to enclose the portion of the opening designed to receive the driving blades 5. This closure member 34 is swingably mounted on the rod 351 and is yieldingly held in closed position by the spring 36, see FIG. 7, and this closure member 34 underlaps the closure member 33, see FIG. 2, when in closed position and it automatically closes when the generator is in projected position.

It will be noted that the generator unit is guarded by the wheels in the event of landing of the airplane with the generator in projected position. In the embodiment illustrated, the generator unit is manually adjusted to its retracted position shown by full lines in FIG. 2. As stated, various parts of the embodiment of my invention illustrated are conventionally illustrated, as they would probably be greatly varied to meet particular installation conditions or requirements of variations in the fuselage of airplanes.

Having thus described the invention, what is claimed as new and desired to secure by Letters Patent is:

1. In combination with an airplane fuselage having a bottom portion with an opening therein, of an electric generator unit including a housing and a driving shaft projecting from the housing and having driving blades on its projecting end, said opening in said fuselage bottom being dimensioned to permit the passage of said generator unit therethrough, a generator supporting standard comprising a body member disposed within said fuselage in vertically spaced aligned relation with said opening and downwardly diverging supporting legs therefor connected to the fuselage bottom in laterally spaced relation to said opening therein, a vertically disposed tubular slideway supportedly mounted on said standard body member and having aligned vertical slots therein, a hanger for said generator fixedly secured to and projecting upwardly therefrom and reciprocatingly mounted in said slideway and having laterally projecting lugs slidably engaged in said slots in said slideway preventing rotative movement of said hanger in said slideway, the bottom of the slots constituting stops for said lugs limiting the downward movement of said generator and supporting said generator in its lowered use position, a coiled spring disposed in said slideway above said hanger and acting to project said generator to use position, and a spring actuated manually releasable detent reciprocatingly mounted on said supporting standard, said slideway and said hanger having alignable keeper openings for said detent when said generator unit is in retracted position.

2. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed tubular slideway having vertical slots therein, a hanger for said generator fixedly secured thereto and projecting upwardly therefrom and reciprocatingly mounted in said slideway and having lugs slidably engaged with said slots in said slideway preventing rotative movement of said hanger in said slideway, the bottoms of the slots constituting stops for said lugs limiting the downward movement of the generator and supporting it in its lowered use position, a spring actuated detent reciprocatingly mounted on said generator support means, said slideway and hanger having alignable keeper openings with which said detent automatically engages when said generator unit is in retracted position, a coiled spring disposed in said slideway above said hanger and acting to project said generator to use position when said detent is retracted, a closure member mounted on said generator unit for closing the portion of the opening in said fuselage through which the body portion of said generator is reciprocable, and a downwardly opening supplemental closure member mounted on said body member to close the portion of the opening provided in the fuselage bottom for said generator blades.

3. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed tubular slideway having vertical slots therein, a hanger for said generator fixedly secured thereto and projecting upwardly therefrom and reciprocatingly mounted in said slideway and having lugs slidably engaged with said slots in said slideway preventing rotative movement of said hanger in said slideway, the bottoms of the slots constituting stops for said lugs limiting the downward movement of the generator and supporting it in its lowered use position, a spring actuated detent reciprocatingly mounted on said generator support means, said slideway and hanger having alignable keeper openings with which said detent automatically engages when said generator unit is in retracted position, a coiled spring disposed in said slideway above said hanger and acting to project said generator to use position when said detent is retracted.

4. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed tubular slideway having vertical slots therein, a hanger for said generator fixedly secured thereto and projecting upwardly therefrom and reciprocatingly mounted in said slideway and having lugs slidably engaged with said slots in said slideway preventing rotative movement of said hanger in said slideway, the bottoms of the slots constituting stops for said lugs limiting the downward movement of the generator and supporting it in its lowered use position, a spring actuated detent reciprocatingly mounted on said generator support means, said slideway and hanger having alignable keeper openings with which said detent automatically engages when said generator unit is in retracted position.

5. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed slideway, a hanger for said generator fixedly secured thereto and projecting upwardly therefrom and reciprocatingly mounted on said slideway, said slideway and hanger having coacting stops limiting the downward movement of the generator and supporting it in its lowered use position, a spring actuated manually releasable detent mounted on said generator support means, and a spring mounted on said slideway and acting to project said generator to use position when said detent is retracted.

6. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed slideway, a hanger for said generator fixedly secured thereto and projecting upwardly therefrom and reciprocatingly mounted on said slideway, said slideway and hanger having coacting stops limiting the downward movement of the generator and supporting it in its lowered use position, and a manually releasable detent mounted on said generator support means.

7. The combination with an airplane fuselage having an opening in the underside thereof, of an electric generator unit including a housing and a driving shaft projecting from said housing and having blades on its projecting end, said opening in said fuselage being dimensioned to permit the passage of said generator unit therethrough, a generator support means comprising a vertically disposed slideway, a hanger for said generator fixedly secured thereto and projecting upwardly therefrom and reciprocatingly mounted on said slideway, said slideway and hanger having coacting stops limiting the downward movement of the generator and supporting it in its lowered use position, a spring actuated manually releasable detent mounted on said generator support means, a spring mounted on said slideway and acting to project said generator to use position when said detent is retracted, and a closure member mounted on said generator unit for closing the portion of the opening in said fuselage through which the body portion of said generator is reciprocable, and a downwardly opening supplemental closure member mounted on said body member to close the portion of the opening provided in the fuselage bottom for said generator blades.

8. The combination with an airplane fuselage having an opening in the wall thereof, of an electric generator unit including a housing and a driving shaft projecting from the housing and having a generator driving blade on its projecting end, a generator supporting means comprising a slideway supportedly mounted in said fuselage, a hanger for said generator fixedly secured thereto and projecting inwardly therefrom and nonrotatably and reciprocatingly mounted in said slideway, an automatically engageable spring actuated manually releasable detent mounted on said slideway and engageable with said hanger for holding said hanger in its retracted position, a spring disposed on said slideway in coacting relation to said hanger and acting to project said generator to use position, and closure means for said opening in said fuselage, said closure means being automatically opened by the projecting of said generator to use position.

9. The combination with an airplane fuselage having an opening in the wall thereof, of an electric generator unit including a housing and a driving shaft projecting from the housing and having a generator driving blade on its projecting end, a generator supporting means comprising a slideway supportedly mounted in said fuselage, a hanger for said generator fixedly secured thereto and projecting inwardly therefrom and nonrotatably and reciprocatingly mounted in said slideway, a manually releasable detent mounted on said slideway and engageable with said hanger for holding said hanger in its retracted position, and closure means for said opening in said fuselage, said closure means being automatically opened by the projecting of said generator to use position.

10. The combination with an airplane fuselage having an opening in the wall thereof, of an electric generator unit including a housing and a driving shaft projecting from the housing and having a generator driving blade on its projecting end, a generator supporting means comprising a slideway supportedly mounted in said fuselage, a hanger for said generator fixedly secured thereto and projecting inwardly therefrom and nonrotatably and reciprocatingly mounted in said slideway, an automatically engageable spring actuated manually releasable detent mounted on said slideway and engageable with said hanger for holding said hanger in its retracted position, and a spring disposed on said slideway in coacting relation to said hanger and acting to project said generator to use position.

11. The combination with an airplane fuselage having an opening in the wall thereof, of an electric generator unit including a housing and a driving shaft projecting from the housing and having a generator driving blade on its projecting end, a generator supporting means comprising a slideway supportedly mounted in said fuselage, a hanger for said generator fixedly secured thereto and projecting inwardly therefrom and nonrotatably and reciprocatingly mounted in said slideway, and a manually releasable detent mounted on said slideway and engageable with said hanger for holding said hanger in its retracted position.

References Cited in the file of this patent

UNITED STATES PATENTS

| 1,733,891 | Loudy | Oct. 29, 1929 |
| 2,177,801 | Erren | Oct. 31, 1939 |
| 2,977,071 | Plotkowiak | Mar. 28, 1961 |

FOREIGN PATENTS

| 911,695 | Germany | May 17, 1954 |